United States Patent
Dockser et al.

(10) Patent No.: US 8,082,287 B2
(45) Date of Patent: Dec. 20, 2011

(54) PRE-SATURATING FIXED-POINT MULTIPLIER

(75) Inventors: Kenneth Alan Dockser, Cary, NC (US); Bonnie Collett Sexton, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1505 days.

(21) Appl. No.: 11/336,358

(22) Filed: Jan. 20, 2006

(65) Prior Publication Data
US 2007/0174379 A1    Jul. 26, 2007

(51) Int. Cl.
*G06F 7/52* (2006.01)

(52) U.S. Cl. ........................ 708/620; 708/628

(58) Field of Classification Search ................ 708/620, 708/628
See application file for complete search history.

(56) References Cited

U.S. PATENT DOCUMENTS

| | | | |
|---|---|---|---|
| 5,220,525 A | 6/1993 | Anderson et al. | |
| 6,574,651 B1 | 6/2003 | Cui et al. | |
| 7,058,830 B2 | 6/2006 | Dhong et al. | |
| 2008/0098057 A1* | 4/2008 | Takeuchi et al. | 708/523 |

FOREIGN PATENT DOCUMENTS

| | | |
|---|---|---|
| EP | 1052567 | 11/2000 |
| EP | 0992885 | 12/2000 |
| EP | 0992885 B1 | 12/2005 |
| JP | 01267728 | 10/1989 |
| JP | 10149277 | 6/1998 |
| JP | 11126157 | 8/1999 |
| RU | 2263947 | 11/2005 |

OTHER PUBLICATIONS

International Preliminary Report on Patentability—PCT/US07/060816, The International Bureau of WIPO, Geneva, Switzerland—Jul. 22, 2008.
International Search Report—PCT/US07/060816, International Search Authority—European Patent Office—Aug. 22, 2007.
Written Opinion—PCT/US07/060816, International Search Authority—European Patent Office—Aug. 22, 2007.

* cited by examiner

*Primary Examiner* — Tan V Mai
(74) *Attorney, Agent, or Firm* — Peter M. Kamarchik; Nicholas J. Pauley; Jonathan T. Velasco

(57) ABSTRACT

A pre-saturating multiplier inspects the operands to a multiply operation prior to performing any multiplication. If the operands will cause an overflow requiring saturation, the multiplier outputs the saturated value without multiplying the original operands. In one embodiment, parameters derived from the operands are altered such that when the multiply operation is performed on the altered parameters, the multiplier produces the saturated result. This may comprise altering a Booth recoded bit group to select a negative zero instead of a zero as a partial product, and suppressing the addition of the value one to the partial products (thus effectively subtracting the value one). In another embodiment, when the operands that will cause an overflow are detected, the output of the multiplier is forced to a predetermined saturation value.

15 Claims, 3 Drawing Sheets mark# PRE-SATURATING FIXED-POINT MULTIPLIER

FIELD

The present disclosure relates generally to the field of digital circuits and in particular to a pre-saturating, fixed-point multiplier.

BACKGROUND

Fixed-point multiplication is a fundamental arithmetic operation performed by digital computational circuits, such as processors. Most processor instruction set architectures include a variety of fixed-point multiply instructions. A known hazard of fixed-point multiplication is that under some conditions (as more fully described herein), a product may exceed the numeric value that can be represented in the available bit width, a condition known as overflow. In this case, to avoid a gross misrepresentation of the product, a multiply instruction will specify a "saturated" output, which is the largest numerical value that can be represented in the available bit field—in effect, the closest approximation possible to the actual product. This is known as a saturating fixed-point multiply instruction. Such instructions typically specify a bit width for the product that is twice the bit width of the operands.

Both integer and fractional values can be represented in fixed-point digital form, depending on the convention used. Commonly all modern processors use the two's complement format to represent positive and negative integers in fixed-width digital representations. The two's complement format is common. In two's complement representation, integers are "signed." That is, whether an integer is positive or negative may be determined by inspection of the Most Significant Bit (MSB), or the "sign bit." Additionally, in two's complement representation, binary arithmetic operations on signed integers yield the correct two's complement results.

Positive two's complement numbers are represented in simple binary form, with a zero sign bit. Consequently, the largest positive number that can be represented in two's complement format is $2^{n-1}-1$, where n is the bit width of the digital representation. Negative two's complement numbers are represented as the binary number that when added to a positive number of the same magnitude equals zero. Negative two's complement numbers have a sign bit of one. Since the two's complement representation of negative numbers may utilize all n bits of the digital representation, the largest negative number that can be represented in two's complement format is $2^{n-1}$, which is one larger in magnitude than the largest positive two's complement number. Thus, for example, the range of signed integer values that may be represented in a 32-bit field is $-2^{31}$ (0x8000 0000) to $+2^{31}-1$ (0x7FFF FFFF).

The negation of any two's compliment number may be formed by bit-wise inverting the number (yielding the one's complement), and adding one. Hence, one way to calculate the two's complement representation of a negative number is to invert the binary representation of the corresponding positive number (which is the one's compliment form of that positive number) and add one. The sole exception to this algorithm for negation is the largest negative number than can be represented. Performing a two's compliment negation on that number results in the same number, which is an overflow error. Note also that negating the two's compliment of zero yields zero—inverting all the bits yields all ones, and adding one yields zero (when the carry out is discarded).

Fractional values may be represented in fixed-width digital form using the so-called Q format notation. In Qn.x format notation, the bits of a value are interpreted as: one sign bit, n integer bits and x fraction bits. A common Q format for digital signal processing is Q0.x (or simply Q.x) indicating that there is one sign bit, no integer bits and x fraction bits. A number in Q.31 notation would be expressed in 32 bits and would have values ranging from –1 (0x8000 0000) to $1-2^{-31}$ (0x7FFF FFFF).

When multiplying numbers in Q format, it is important to account for the binary point. For example, multiplying a Q.15 times a Q.15 will yield a result in Q2.30. However, it is desirable to keep the value in Q.x format. To handle this, the multiplication operations include a multiplication by a factor of 2—which is equivalent to a left shift operation—to produce a Q.31 result. Multiplying two n-bit values together will always produce a value that can be represented in 2n bits. Doubling this product will produce a value that can be represented in 2n bits in all but one case: the maximum negative value. The maximum negative value in two's complement is a sign bit (MSB) of one with all other bits zero. Shifting this value left results in an overflow.

An example is the following multiplication of two 16-bit operands to generate a 32-bit product. Each of the operands is negative (sign bit of one), and their product should be a positive number.

0x8000×0x8000=0x4000 0000 Multiplication

0x4000 0000×0x2=0x8000 0000 Doubling (incorrect result; should be positive)

0x8000 0000–1=0x7FFF FFFF Saturated Result (largest positive value)

In this example, the two operands are each the largest negative number that can be represented in 16 bits in two's complement format. Their product should yield a large positive value. However, the actual result of the doubling multiply instruction is the largest negative value. Hence, a '1' must be subtracted from this value to obtain the saturation value of 0x7FFFFFFF—a zero sign bit with all ones in the other bit positions.

Conventional saturating multipliers detect an overflow condition only after the multiplication is performed, and must then take steps to correct the overflow condition by saturating the output. In some implementations, this may require halting the processor, such as by causing an exception. This adversely impacts processor performance and causes increased power consumption. Even where the overflow is saturated in hardware, doing so after the multiplication completes adversely impacts performance.

SUMMARY

According to one or more embodiments, a pre-saturating multiplier inspects the operands to a multiply operation prior to performing any multiplication. If the operands will cause an overflow requiring saturation, the multiplier outputs the saturated value without multiplying the operands.

In one embodiment, parameters derived from the operands are altered such that when the multiply operation is performed on the altered parameters, the multiplier produces the saturated result. This may comprise altering a Booth recoded bit group to select a negative zero instead of a zero as a partial product, and suppressing the addition of the value one to the partial products (thus effectively subtracting the value one). In another embodiment, when the operands that will cause an overflow are detected, the output of the multiplier is forced to a predetermined saturation value.

One embodiment relates to a method of performing a fixed point saturating multiply operation for which at least one known set of operands, comprising a multiplier and a multiplicand, will cause an overflow requiring saturation. The operands that will cause an overflow are detected prior to performing any multiply operation, and a saturated result is output without multiplying the operands.

Another embodiment relates to pre-saturating multiplier that includes a multiplier circuit operative to multiply two operands, comprising a multiplier and a multiplicand, and to output their product. The pre-saturating multiplier also includes an overflow pre-detect circuit operative to detect operands that will cause an overflow in the multiplier circuit.

DETAILED DESCRIPTION

Figure 1:
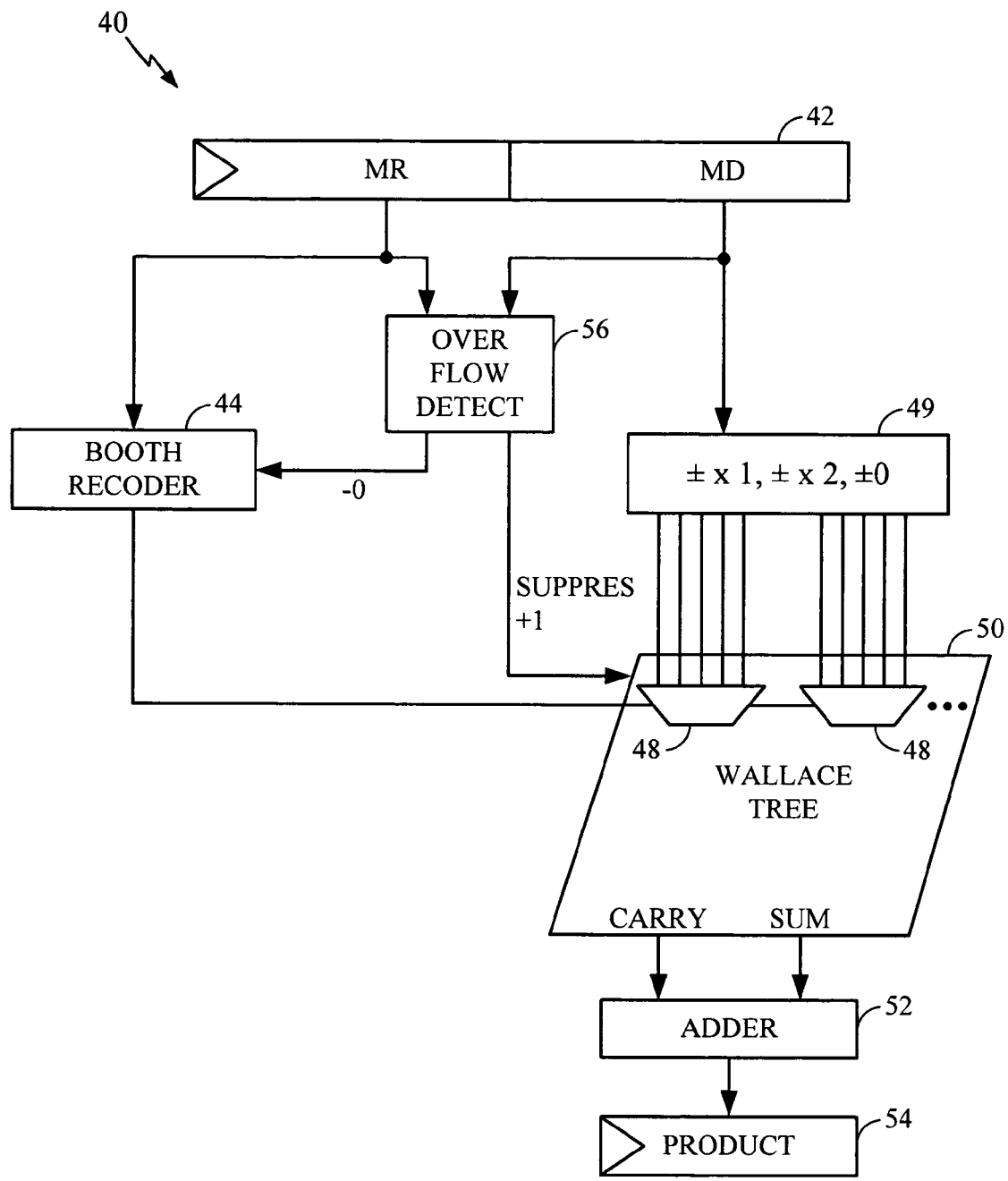
FIG. 1 is a functional block diagram of a pre-saturating multiplier according to one embodiment.

A multiplier detects operands to a multiply operation that will result in an overflow condition if the multiply were performed. In response to this detection, the multiplier outputs a saturated value. In one embodiment, the multiplier outputs a saturated value by altering the operands in such a way that the multiply operation will result in the saturated value as the product. FIG. 1 depicts a pre-saturating multiplier 40 according to this embodiment. A GPR register 42 contains multiplier (MR) and multiplicand (MD) operands. The multiplier is input to a Booth recoder circuit 44.

Booth recoding (sometimes referred to as modified Booth recoding) is a technique for reducing the number of partial products to be added in performing a multiply operation. Rather than consider each bit in the multiplier and generate a corresponding shifted partial product comprising either the multiplicand or zero, the multiplier bits are considered in groups, and shifted partial products comprising +/− multiples of the multiplicand are added. This technique reduces the number of partial products to be added. For example, in radix-4 Booth Recoding, the multiplier bits are considered in groups of two, along with the MSB of the previous group (with a zero appended to the first group). Partial products are then generated based on the value of the bit groups, according to the following table:

TABLE 1

Radix-4 Booth Recoding

| Bit Group | Partial Product |
|---|---|
| 000 | 0 |
| 001 | 1 × multiplicand |
| 010 | 1 × multiplicand |
| 011 | 2 × multiplicand |
| 100 | −2 × multiplicand |
| 101 | −1 × multiplicand |
| 110 | −1 × multiplicand |
| 111 | 0 |

For each Booth recoded bit group in the multiplier, the multiplicand is multiplied by the indicated factor, and the resulting partial product is shifted to the position of the bit group within the multiplier. The partial products are then summed to yield the product. When multiplying signed values, radix-4 Booth recoding may reduce the number of partial products by up to half.

In this implementation, the outputs of the Booth recoder 44 select partial products for the Wallace Tree 50 (or other adder) via Booth multiplexers 48. The Booth multiplexers 48 select the appropriately modified multiplicand from shift/invert logic 49, and each mux 48 is aligned to the recoded bit group position in the multiplier. The shift/invert logic 49 generates the modified multiplicands specified in the Table 1 as follows:

0 substitutes all zeros for the multiplicand bits;

×1 passes the multiplicand bits directly;

×2 left-shifts the multiplicand bits one bit position; and a negation performs a bit-wise invert (one's compliment) on the multiplicand, shifted multiplicand, or zero value.

Note that the negation is not complete until a '1' is added at the LSB to the partial products within the Wallace Tree 50 (per the two's compliment rule for negation: one's compliment+1). The Tree 50 sums the partial products, outputting a sum and carry, which are added in a carry propagate adder 52, and the product is latched at 54. Those of skill in the art will recognize that the output of the Booth recoder and the outputs of the Booth multiplexers 48 (or the multiplicand value) may be latched to allow for pipelining.

An overflow detect circuit 56 monitors the multiplier and multiplicand at the beginning of each multiply operation, detecting values of the operands that will result in an overflow requiring saturation. When a pending overflow is detected, the overflow detect circuit 56 signals the Booth recoder 44 to alter the recoding of the multiplier bits, and signals the Wallace Tree 50 to alter the summation of partial products, in such a way that the multiply operation will result in a saturated value for the product. This is feasible because a limited number of operands will cause an overflow, and these operands are known in advance.

In particular, in one embodiment, only the case of the multiplier and the multiplicand both comprising the largest negative value will cause an overflow requiring saturation. When this condition is detected, overflow detect circuit 56 directs a signal to the Booth recoder 44 to alter the Booth recoding. In response, the Booth recoder 44 modifies the least significant Booth recoded bit group (which, having a value of 000, would normally select a zero) to select negative zero. The shift/invert logic 49 provides the one's compliment of zero (i.e., all ones), and signals the Wallace Tree 50 to add a '1' to the partial products. The overflow detect circuit 56 additionally directs a suppression signal to the Wallace Tree 50 to suppress adding the '1' associated with the negation of zero (note that in a pipelined implementation, the "suppress +1" signal would be latched). Accordingly, the sign-extended one's compliment of zero (0×FFFF FFFF) is added as a partial product, but the corresponding '1' is not—effectively subtracting a '1' from the result. For example:

0×8000×0×8000=0×40000000 Multiplication of two most negative values

0×40000000×0×2=0×80000000 Doubling

0×80000000+0×FFFFFFFF=0×7FFFFFFF Saturated Result (effectively subtract '1')

This saturated result is output by the carry propagate adder 52, and latched as the product at 54. According to this embodiment, the timing of the saturating multiply operation is the same as that for operands that do not cause an overflow and thus require saturation. In particular, no delay is added to the output of the multiplier 40. Hence, this embodiment may find particular applicability where the timing of the multiplication operation is critical, and no additional delay may be tolerated at the multiplier 40 output.

Figure 2:
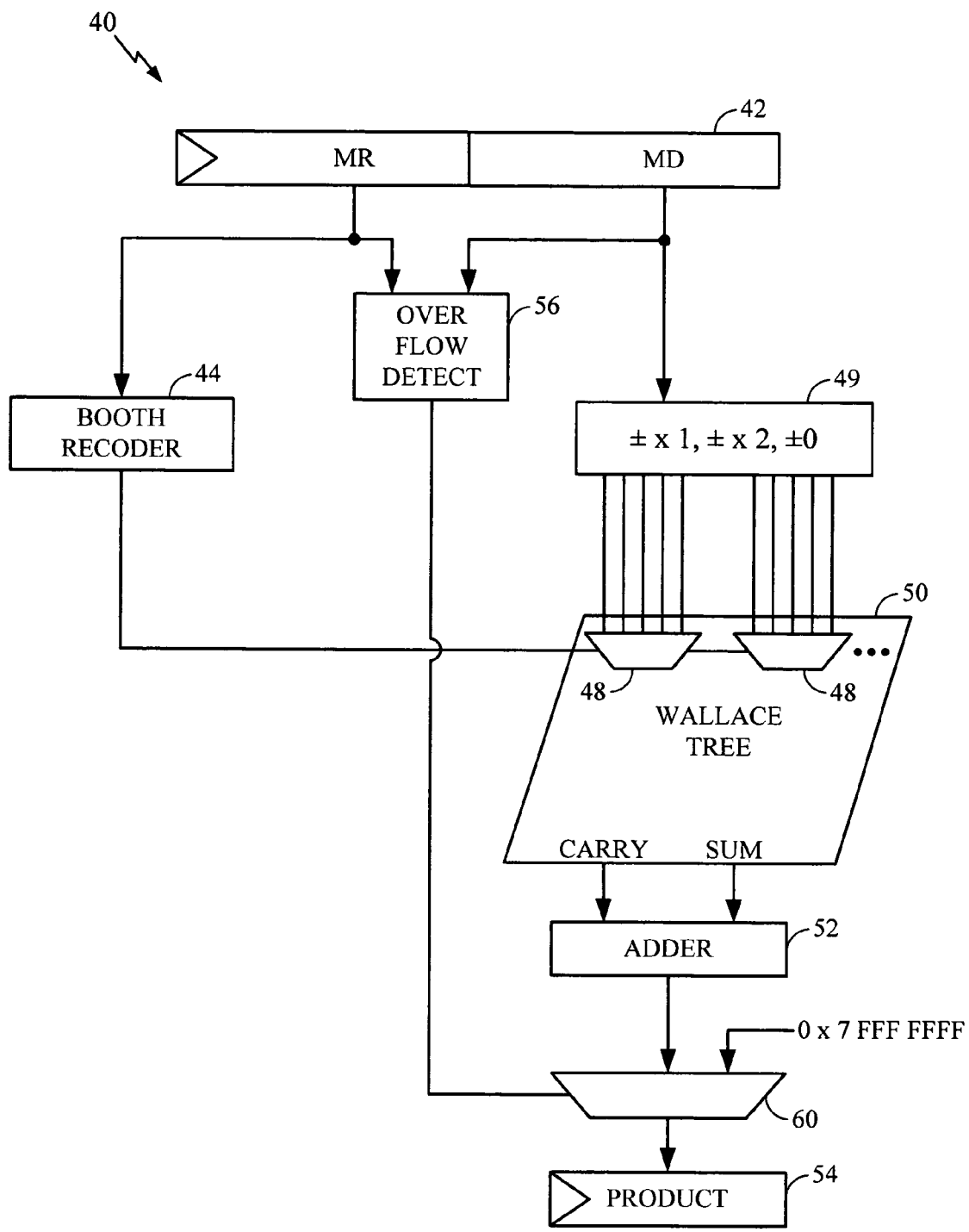
FIG. 2 is a functional block diagram of a pre-saturating multiplier according to another embodiment.

FIG. 2 depicts another embodiment of a pre-saturating multiplier 40, wherein corresponding components are numbered accordingly. In this embodiment, the overflow detect circuit 56 monitors the multiplier and multiplicand, detecting the known operands that will result in an overflow requiring saturation. When these operands are detected, the overflow detect circuit 56 outputs a signal that substitutes a saturated result for the multiplier 40 product output. For example, the overflow detect circuit 56 may output a multiplexer select signal that directs the multiplexer 60 to select a predetermined saturation output in lieu of the output of the carry propagate adder 52. The predetermined saturation output may comprise a hard-wired value (i.e., with bit positions tied to high or low voltage rails), or alternatively may comprise the output of a storage location such as a register. In an embodiment where a plurality of operands may cause overflows requiring different saturation values, the overflow detect circuit 56 may output a multi-bit multiplexer select signal, which chooses between a plurality of predetermined saturation values and the output of the adder 52. The overflow detect circuit 56 output may be latched in a pipelined implementation.

In this embodiment, the multiply operation may be suppressed (that is, the Booth Recoder 44, logic block 49, Wallace Tree 50, carry propagate adder 52, and other multiplier circuits may be disabled) to reduce power consumption. Alternatively, the multiplication of the operands may be allowed to proceed through the multiplier 40, and the result simply discarded, as the saturated result is latched at 54 instead. In this embodiment the delay of the multiplexer 60 is added to every multiply operation performed by the multiplier 40, although this delay may be mitigated by using an unused leg of an existing multiplexer, using a mux-latch, or by other techniques known in the art. The overflow condition is determined very early, and the decision to select a saturated value is not part of the critical path.

Figure 3:
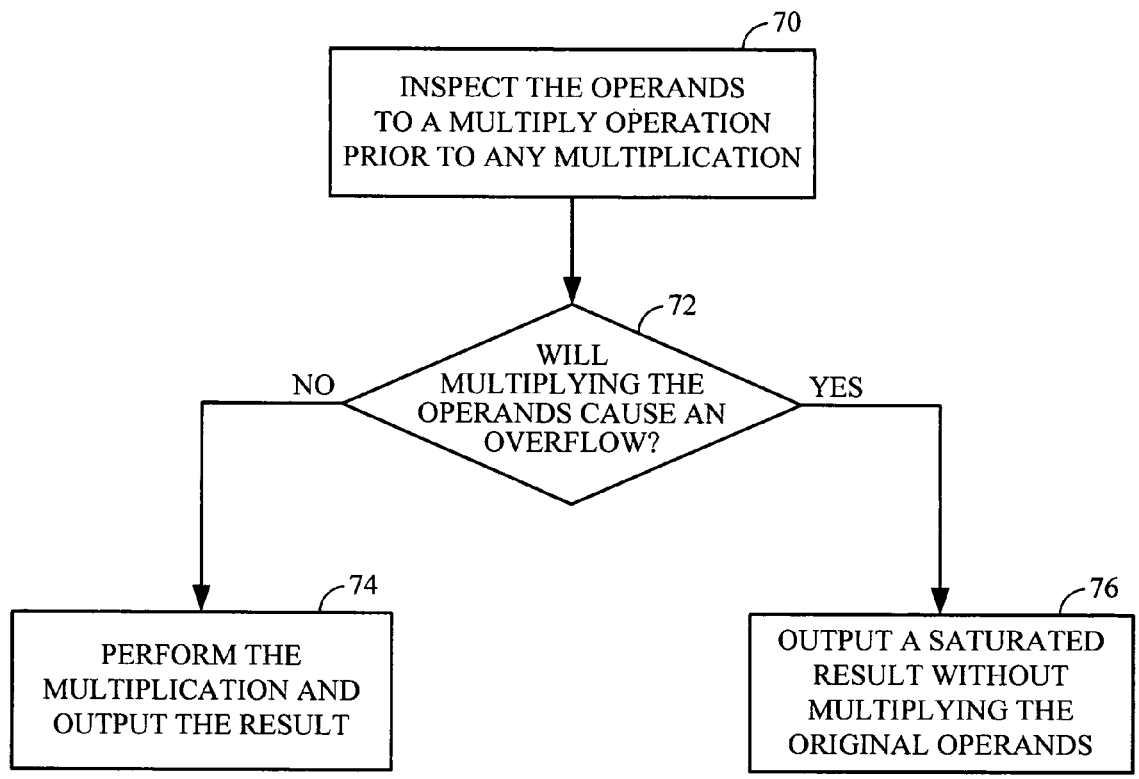
FIG. 3 is a flow diagram of a method of performing a pre-saturating multiply operation.

FIG. 3 depicts a method of performing a fixed-point saturating multiply operation for which at least one known set of operands will cause an overflow requiring saturation. Initially (i.e., prior to performing any multiplication), the operands are inspected (block 70). The operands are compared to known values that will cause an overflow (block 72). For example, in some cases, if both operands comprise the largest negative value that may be represented within the operand bit field, an overflow will result. If multiplying the operands will not cause an overflow (block 72), the multiplication is performed and the results are output (block 74). If multiplying the operands will result in an overflow requiring saturation (block 72), then according to one or more embodiments, the saturated result is output without multiplying the original operands (block 76).

In one embodiment, this comprises altering parameters generated from the operands in such a manner that performing the multiply operation on the altered parameters results in the saturated value as the product of the multiply operation. In another embodiment, outputting the saturated result comprises selecting a predetermined saturation value as the output in lieu of the product from the multiply operation.

In both embodiments (i.e., those depicted in FIGS. 1 and 2), the operands that will cause an overflow are detected early, and the multiplier 40 outputs a saturated result directly. This represents a significant performance improvement and power savings over the conventional methodology of only detecting the overflow by inspecting the product, and subsequently substituting a saturated value for the product. The multiplier 40 according to one or more embodiments disclosed herein is particularly suited for high-speed processors, and/or processors where low power consumption is a critical factor, such as for battery-powered portable electronic devices.

Although the present inventive concepts have been described herein with respect to particular features, aspects and embodiments thereof, it will be apparent that numerous variations, modifications, and other embodiments are possible within the broad scope of the present teachings. The present embodiments are therefore to be construed in all aspects as illustrative and not restrictive and all changes coming within the meaning and equivalency range of the appended claims are intended to be embraced therein.

What is claimed is:

1. A method of performing a fixed point saturating multiply operation in a multiplier circuit for which at least one known set of operands, comprising a multiplier operand and a multiplicand operand, will cause an overflow requiring saturation, comprising:
   detecting in an overflow pre-detect circuit, the multiplier and multiplicand operands that will cause an overflow prior to performing any multiply operation;
   deriving Booth recoded bit groups from the multiplier operand; and
   outputting a saturated result, wherein at most one of the Booth recoded bit groups derived from the multiplier is altered.

2. The method of claim 1 wherein the operands that will cause an overflow are the largest negative numbers that can be represented in the operand bit field.

3. The method of claim 1 further comprising:
   adjusting one or more parameters derived from the operands so that a multiply operation with the adjusted parameters will generate the saturated result; and
   performing a multiply operation with the adjusted parameters.

4. The method of claim 1 wherein altering a Booth recoded bit group comprises changing the selection of a Booth recoded bit group from zero to negative zero and suppressing the addition of the value 1 to partial products derived from the multiplicand.

5. The method of claim 3 wherein adjusting one or more parameters derived from the operands comprises adding the value negative one to partial products derived from the operands.

6. A pre-saturating multiplier, comprising:
   a multiplier circuit operative to multiply two operands, comprising a multiplier and a multiplicand, and to output their product;
   a Booth recoder operative to recode the multiplier into bit groups, each bit group selecting a positive or negative multiple of the multiplicand as a partial product, the Booth recoder further operative to alter at most one bit group to produce a saturated result in the multiplier, in response to the overflow pre-detect circuit; and
   an overflow pre-detect circuit operative to detect operands that will cause an overflow in the multiplier circuit.

7. The multiplier of claim 6 wherein the overflow pre-detect circuit detects the largest negative values that can be represented in the operand bit fields.

8. The multiplier of claim 6 wherein the Booth recoder is operative to force the least significant recoded bit group to select negative zero in response to the overflow pre-detect circuit.

9. The multiplier of claim 6 further comprising a parallel adder operative to add the partial products and to add the value one for negative partial products selected by the Booth recoded bit groups, the parallel adder further operative to suppress the addition of the value one for a negative zero in response to the overflow pre-detect circuit.

10. The multiplier of claim 6 wherein the multiplier circuit is operative to subtract the value one from the product in response to the overflow pre-detect circuit.

11. An apparatus for a fixed point saturating multiply operation in a multiplier circuit for which at least one known set of operands, comprising a multiplier operand and a multiplicand operand, will cause an overflow requiring saturation, comprising:
   means for detecting in an overflow pre-detect circuit, the multiplier and multiplicand operands that will cause an overflow prior to performing any multiply operation;
   means for deriving Booth recoded bit groups from the multiplier operand; and
   means for outputting a saturated result, wherein at most one of the Booth recoded bit groups derived from the multiplier is altered.

12. The apparatus of claim 11, wherein the operands that will cause an overflow are the largest negative numbers that can be represented in the operand bit field.

13. The apparatus of claim 11 further comprising:
   means for adjusting one or more parameters derived from the operands so that a multiply operation will generate the saturated result; and
   means for performing a multiply operation with the adjusted parameters.

14. The apparatus of claim 13, wherein means for adjusting one or more parameters derived from the operands comprises means for adding the value negative one to partial products derived from the operands.

15. The apparatus of claim 11, wherein the means for altering a Booth recoded bit group comprises means for changing the selection of a Booth recoded bit group from zero to negative zero and means for suppressing the addition of the value 1 to partial products derived from the multiplicand.

* * * * *